United States Patent Office 2,880,216
Patented Mar. 31, 1959

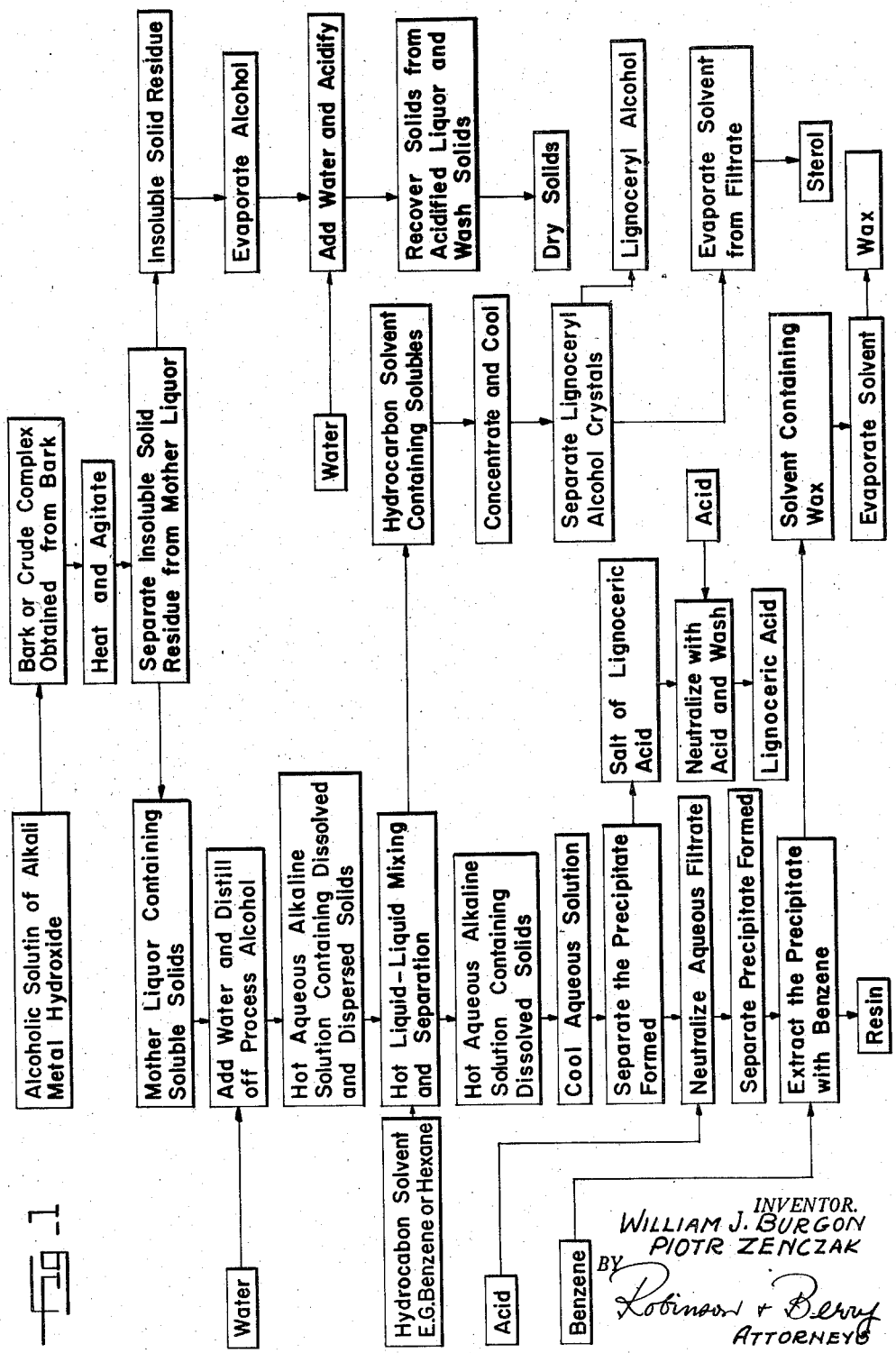

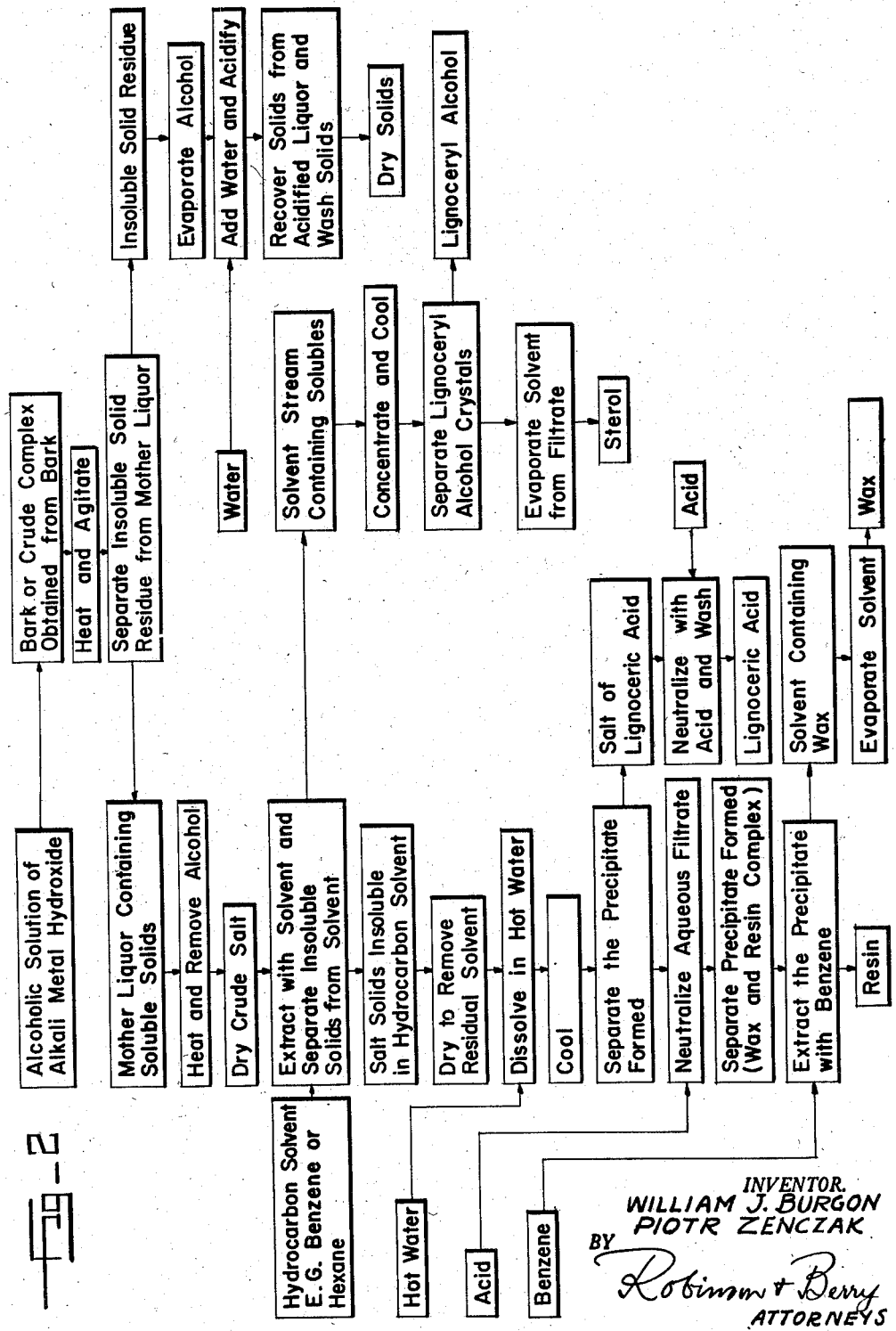

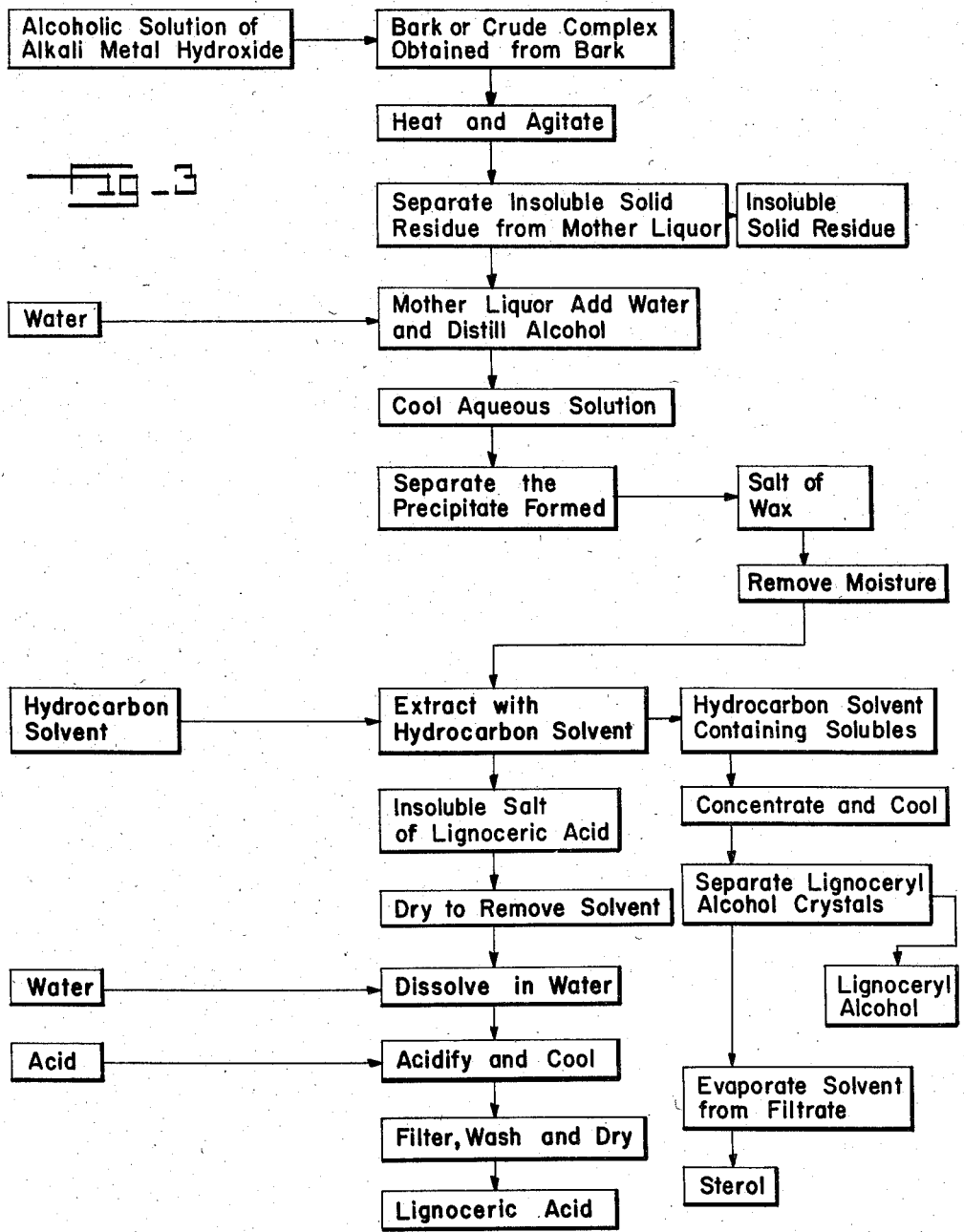

2,880,216

PROCESS OF SEPARATING A CRUDE COMPOSITION OBTAINED FROM BARK INTO ITS COMPONENT PARTS

William James Burgon, New Westminster, British Columbia, Canada, and Piotr Zenczak, Coos Bay, Oreg.

Application October 29, 1956, Serial No. 618,849

10 Claims. (Cl. 260—397.25)

This invention relates to the treatment of complex crude materials from bark. More particularly, the invention relates to improved methods or processes for separating the crude composition derived from bark into the several chemical fractions of which the crude is composed. The essence of the invention resides in the new and improved methods whereby the total crude, in dry salt form or as an aqueous alkaline solution, may be processed for the separation and recovery of the lignoceryl alcohol, sterol and lignoceric acid fractions which are present in the crude. Further, this invention provides a method for the recovery of lignoceryl alcohol, sterol and lignoceric acid from the material previously recovered as salt of wax.

It is not intended nor desired that this invention be limited to a crude to be produced in any specific manner. The crude compositions may be obtained by various methods and the crudes utilized in the several experiments are merely typical examples. It is to be understood that other total crudes obtained from bark may also be processed as hereinafter described to separate and recover the chemical fractions of bark in accordance with the teaching of this invention.

A crude may be obtained by grinding or dividing the bark and then treating the bark in an alcohol solution of an alkali metal hydroxide such as sodium hydroxide or potassium hydroxide. The solids are separated from the solution and the crude is obtained from the solution. The solution may be dried to form a crude mass of solids or it may be transferred from the alcohol solution to an aqueous solution. After the crude is produced and separated, a variety of valuable products such as waxes, resin, fatty acids and alcohols may be obtained from the crude. It is known that a salt of wax may be recovered from the crude. It has been discovered that this salt of wax is a composition of lignoceryl alcohol, sterol and lignoceric acid. The present invention embodies new and improved methods for removing these separate chemical fractions which are combined in the crude or in the salt of wax by the methods hereinafter described.

Illustrated in the accompanying diagrammatic drawings is a method by which the lignoceryl alcohol, sterol and lignoceric acid may be removed from an alkaline crude obtained from bark or from the salt of wax obtained from this alkaline crude. Also illustrated is the manner in which a bark extract material may be converted into a refined crude salt and the steps by which the lignoceryl alcohol, sterol and lignoceric acid are removed from this refined crude salt. The inventions herein disclosed will be described with reference to the accompanying drawings wherein:

Fig. 1 is a flow diagram illustrating a process for producing and recovering lignoceryl alcohol, sterol and lignoceric acid as salt from a crude in the form of an aqueous solution.

Fig. 2 is a flow diagram illustrating a process for recovering lignoceryl alcohol, sterol and lignoceric acid as a salt from a crude in the form of a dry salt.

Fig. 3 is a flow diagram illustrating a process for recovering lignoceryl alcohol, sterol and lignoceric acid as a salt from a salt of wax.

The crude, whether obtained from the initial treatment of the bark or from subsequent treatment as herein disclosed, is a mixture of the alkali metal hydroxide and the organic reaction products which are produced and separated from the bark in the initial treatment. As previously stated, when the salt of wax is recovered from the crude, substantially all of the lignoceryl alcohol, sterol and lignoceric acid which are available in the crude are present in this salt of wax. When the wax is recovered in salt form, the lignoceric acid is present in the wax as a salt which has precipitated by cooling the aqueous solution of the total crude. The lignoceryl alcohol and sterol fractions are not soluble, but are dispersed in the hot total crude solution and upon cooling the total crude solution, these fractions tend to coagulate and adhere to the lignoceric acid fraction which precipitates as a salt.

The new and improved methods of recovering the lignoceryl alcohol and sterol and lignoceric acid from the crude comprises two steps. In the first step, a total crude is extracted to remove the lignoceryl alcohol and sterol and the residual crude is then treated so as to recover the lignoceric acid as a salt precipitate. These new and improved methods have several advantages.

The principal advantage and novelty of this invention is that the lignoceric acid is separated as a salt thus avoiding the step of acidification of the aqueous solution and the use of additional solvent.

Another advantage is that the total steps may be reduced because the crude is maintained in an aqueous solution while the lignoceryl alcohol, sterol and lignoceric acid are removed. The lignoceryl alcohol and sterol are removed from the crude medium while in a liquid state thus permitting easier handling and more efficient separation. Although it is preferable to handle the crude as a liquid, as will hereinafter be more fully explained, the lignoceryl alcohol and sterol can be removed from the dried total crude salt or from the crude salt in solution. After such removal, the salt of lignoceric acid can be separated from the residual crude in solution. Experiments demonstrating the alternative methods will be hereinafter described.

The method of processing of a crude in aqueous solution to remove the lignoceryl alcohol, sterol and lignoceric acid is as follows: If the crude has been recovered in dry form, the total crude salt is first dissolved in hot water, the ratio being 5 to 7 parts by weight of hot water to one part of dry crude salt. If the crude is in solution in the initial process alcohol liquor, it transferred to an amount of water equal to about 20% of the weight of the alcohol liquor. The process alcohol is then removed by evaporation. Under these conditions the solution will contain from about 6% to about 18% free NaOH. Since sodium salt of lignoceric acid remains dissolved in the hot alkaline aqueous solution while the lignoceryl alcohol and sterol fractions are dispersed, it is possible to remove the lignoceryl alcohol and sterol fractions with another solvent such as hexane or benzene. The solvent extraction is carried on with from 3 to 5 parts of water immiscible solvent to one part of aqueous solution in a liquid-liquid extractor wherein the lignoceryl alcohol and the sterol components are dissolved in the water immiscible solvent leaving the other components in the aqueous solution. Although the extraction can be carried out with other proportions of the water immiscible solvent and the aqueous solution, and the particular proportions are to some extent determined by the particular equipment used for mixing and separation, good results have been obtained by using the proportion mentioned with simple laboratory apparatus.

It is necessary during the extraction from the aqueous solution that the solution be kept hot to insure that the sodium salt of lignoceric acid will remain in solution. The aqueous solution and the solvent are then separated. The solvent will contain the lignoceryl alcohol and sterol fractions. The extracted fractions can later be separated by concentrating and cooling the solvent to crystallize the lignoceryl alcohol. The crystals may be removed and the sterol recovered from the filtrate by evaporation of the solvent.

The aqueous solution, remaining after the separation of the solvent, is then cooled to precipitate the salt of lignoceric acid. This salt is recovered by filtration from the aqueous liquor. The recovered salt is acidified, washed and melted to provide lignoceric acid. If desired, the filtrate liquor separated from the precipitated salt may be treated by acidification and organic solvent extraction to recover a wax and upon removal of the wax there remains a resin residue.

If, in the initial process, it is desired to treat the crude in a dry form, the following alternative method may be employed. The dry crude salt is extracted with a solvent, such as benzene or hexane, to remove the lignoceryl alcohol and sterol and after extraction, the dry crude salt residue is then dissolved in hot water to form a solution for the recovery of salt of lignoceric acid. In this procedure the salt solids which are insoluble in the hydrocarbon solvent are dried to remove residual solvent and then dissolved in from 5 to 7 parts of hot water. This hot aqueous solution is then cooled to precipitate the salt of lignoceric acid. This precipitated salt is recovered from the cooled alkaline liquor by filtration. The recovered salt is acidified, washed with water, and then melted to provide lignoceric acid in substantially the same manner as previously described. The wax may be recovered from the filtrate and a resin residue remains after the removal of the wax by solvent extraction.

As a more specific example of the methods employed in removing the lignoceryl alcohol, sterol and lignoceric acid from the total salt crude, experiments will be described whereby these products have been recovered by the new and improved methods.

EXAMPLE NO. I

*Recovery from aqueous solution*

(a) To obtain alkali-alcohol crude from bark. 100 grams of Douglas fir bark was ground and dried to a moisture content of approximately 7%. The bark was cooked in an alcohol solution which included 1000 grams of alcohol and 40 grams of sodium hydroxide for approximately two hours at the reflux temperature of the solution. After cooking, the liquor was separated from the bark residue by filtration and the dissolved solids in the liquor were transferred to water by adding 200 grams of water to the liquor and evaporating the alcohol.

*Processing of aqueous crude*

(b) The hot alkali aqueous solution was then placed in an extraction funnel and the temperature of the solution was maintained by immersing the extraction funnel in a hot water bath. Three volumes of hot hexane were added to the solution in the funnel and the two liquids were thoroughly agitated and then allowed to separate. The hot hexane solvent was removed in successive steps as it separated from the aqueous solution. The removed hexane solvent was concentrated to a weight of 10 grams and on cooling lignoceryl alcohol crystals formed and were recovered by filtration. When dried, these crystals weighed 0.42 gram or .42% of the whole weight of the bark. The hexane filtrate after removal of the lignoceryl alcohol crystals, was evaporated and upon evaporation 0.875 gram of sterol was recovered. This is .875% of the raw bark used in the initial step of the process. The total recovery by hexane extraction from the alkali solution was 1.295% of the raw bark.

After removal of the lignoceryl alcohol and sterol by hexane extraction, the aqueous alkali solution was cooled to about 10° C. and upon cooling a white salt precipitated from the solution. This white salt material was recovered by filtration. It was acidified with sulphuric acid, washed and melted. The melted waxy material was identified as lignoceric acid and weighed 3.61 grams or 3.61% of the weight of the raw bark.

The filtrate was recovered from the separation of the precipitated salt and was acidified with sulphuric acid, and from the acidified solution a waxy resin complex precipitated and was recovered by filtration. This complex was washed and dried and then melted. It weighed 2.95 grams or 2.95% of the weight of the raw bark.

EXAMPLE NO. II

*Processing dry crude*

It was desired to use a crude complex derived from Douglas fir back as an alternative starting material for the production of the crude salt which is required for further processing by the methods described.

(a) *Production of dry crude salt from bark extract.*— A five pound sample of crude wax and resin complex from Douglas fir bark was finely ground and charged into a stainless steel reactor fitted with a filter bottom. The reactor contained 8.25 gallons of alcohol in which 2.64 pounds of flake sodium hydroxide had been dissolved. The reactor was made pressure tight and heated under agitation at 10 pounds alcohol vapour pressure for one and one-half hours. The relief valve at the bottom of the reactor, below the filter plate, was then opened to discharge the cooking liquor leaving the insoluble solids as a cake on top of the filter plate inside the reactor. These solids which remained on the filter after separation of the liquor were dried to remove process alcohol then dissolved in water and acidified with sulphuric acid. The precipitate was filtered and washed and dried. This appeared as a dark resin lignin complex and weighed .63 pound or 12.6% of the crude wax resin complex used as a starting material. The liquor which was discharged from the reactor at the completion of the cooking treatment was conveyed through a pipe to a heated concentrator tank and the alcohol was evaporated to obtain a dry salt material.

(b) *Treatment of the dry crude salt.*—The dry salt extract which was recovered by evaporating the alcohol from the discharged cooking liquor was then dispersed in seven gallons of benzene in a reactor, where it was heated under agitation at the reflux temperature of the benzene for one hour. The relief valve at the bottom of the reactor, below the filter plate, was then opened to discharge the benzene to a heated still. The benzene was removed by distillation and a light, melted waxy material was drawn off from the bottom of the still. This material was extracted with 6 pounds of hexane and the hexane extract was concentrated to a weight of 3 pounds and then cooled. After cooling, white crystals of lignoceryl alcohol formed. These crystals were recovered by filtration, dried and melted to a white solid. This white solid is lignoceryl alcohol. It weighed 0.62 pound or 12.4% of the crude wax resin complex used as the starting material. The hexane filtrate, after removal of the lignoceryl alcohol crystals, was evaporated to remove the hexane. Upon evaporation, a light waxy substance remained as a residue. This was recovered as sterol. The weight was 0.16 pound or 3.2% of the crude starting material. The remainder of the salt material which had been extracted with benzene to remove the alcohol and sterol combination was then dried to remove the residual benzene and then dissolved in 7 parts of hot water. The aqueous solution was cooled to 20° C. and conveyed to the vat of a rotary vacuum filter fitted with a fine cloth and washing spray. Upon cooling, a white salt precipitate formed in the liquor and as the liquor was filtered from the vat this white salt was deposited on the cloth and a dark, clear filtrate liquor was drawn off to a separate stainless steel filtrate tank. The white salt cake formed from the deposition on the cloth was washed with spray water and was doctored continuously from the rotating filter face and redissolved and acidified with sulphuric acid. It was then refiltered, melted and cooled to form a white waxy cake of lignoceric acid. This cake weighed 2.07 pounds or 41.4% of the crude wax resin complex used as a starting material.

The filtrate liquor drawn off during the separation of the salt precipitate was acidified in a filtrate tank with sulphuric acid and a precipitate was recovered by filtration. This filter cake was washed and melted to form a dark resinous waxy material. The weight was 0.32 pound or 6.4% of the starting material.

The following is a summary of the materials recovered, shown as percentages of the starting material.

|  | Percent |
|---|---|
| 1. Resin-lignin complex removed as insoluble residue in primary reaction liquor | 12.6 |
| 2. By solvent extraction from the dry salt material soluble in the primary reaction liquor: |  |
|    Lignoceryl alcohol | 12.4 |
|    Sterol | 3.2 |
|  | 15.6 |
| 3. By recovery as a salt precipitate from the residue salt solution after removal of lignoceryl alcohol and sterol-lignoceric acid | 41.4 |
| 4. By extraction separation from the acidified filtrate liquor after removal of the salt precipitate—resin acid and lower waxy acids | 6.4 |

EXAMPLE NO. III

*Processing salt of wax*

A sample of a salt of wax recovered as a precipitate from a crude liquor obtained from Douglas fir bark was dried under very low temperature to remove excess moisture. The salt was then dispersed in hexane and heated to extract the lignoceryl alcohol and sterol. The insoluble salt solids were then separated from the hexane solvent by filtration and the solvent was concentrated and cooled. Lignoceryl alcohol crystals precipitated from the cooled, concentrated solution and were recovered by filtration. When melted, this lignoceryl alcohol weighed 4.45 grams. The hexane filtrate from the separation of the alcohol crystals was evaporated to yield 2.10 grams of sterol. The insoluble salt solids which had been previously separated from the hexane solvent were then dissolved in hot water and the solution was heated to remove traces of hexane. The solution was acidified and cooled and the precipitated solids were filtered, washed and then melted. This light colored waxy material was lignoceric acid weighing 19 grams.

The recoveries were:

Lignoceryl alcohol__ 4.45 grams—17.42% of the salt of wax
Sterol _____ 2.10 grams— 8.20% of the salt of wax
Lignoceric acid ____ 19.00 grams—74.38% of the salt of wax Total_____ 25.55 grams The inventions herein described are not to be limited to specific details or limitations but it is intended and desired that the inventions be given the broadest possible scope based upon the herein contained disclosures and explanations.

It will be readily appreciated that the specific disclosures may be altered without departing from the basic concepts and teaching and the claims appended hereto shall not be restricted in their interpretation beyond that which may be required by the prior art.

As used in the claims of this application, the term "hydrocarbon solvents" refers to the solvents specifically named in the foregoing description and examples, namely, hexane and benzene. The term "alcohol" refers to a bark extracting alcohol, i.e., any alcohol that is customarily used to extract chemical components from bark material. The term "wax" dentifies the residual substance recoverable from the crude after the lignoceric acid, lignoceryl alcohol and sterol have been removed. The "salt of wax" is a composition of lignoceric acid, lignoceryl alcohol, sterol and the residual wax. The "sterol" is a substance present in and extractable from bark which may be separated from the crude by the method or process taught in this application.

What is claimed as new is:

1. A method of processing an alkaline composition obtained from bark, comprising extracting the composition with a hydrocarbon solvent selected from the group consisting of hexane and benzene, to remove the solvent solubles, dissolving the residue in a hot aqueous solution, cooling the solution and thereby causing a precipitate to be formed, separating the precipitate and thereby recovering salt of lignoceric acid as a precipitate.

2. A method as in claim 1 wherein the solvent solution containing the solvent solubles is further processed by concentrating and cooling, then separating lignoceryl alcohol crystals by filtration, and then evaporating the solvent from the filtrate and recovering sterol containing residue.

3. A method of processing an alkaline composition obtained from bark wherein part of the composition is dissolved in hot aqueous solution and a part is dispersed in the hot aqueous solution, comprising extracting the solution with a hydrocarbon solvent selected from the group consisting of hexane and benzene, to remove the dispersed solvent solubles by liquid-liquid extraction, cooling the extracted aqueous solution thereby causing a salt precipitate to be formed, separating the precipitate, acidifying the precipitate and recovering lignoceric acid.

4. A method as in claim 3 wherein the precipitate is separated from the aqueous solution by filtration, extracting the filtrate with a hydrocarbon solvent selected from the group consisting of hexane and benzene, and recovering a wax residue.

5. A method as in claim 3 wherein the solvent solution containing the solvent solubles is further processed by concentrating and cooling, then separating lignoceryl alcohol crystals by filtration, and then evaporating the solvent from the filtrate and recovering sterol containing residue.

6. A method of processing a crude composition obtained from bark, comprising treating the composition in a solution of bark extracting alcohol and an alkali metal hydroxide so as to convert the composition to alkaline form, removing the liquid and recovering a dry crude salt, extracting the crude salt with a hydrocarbon solvent selected from the group consisting of hexane and benzene to removing the solvent solubles, dissolving the extracted crude in hot water, cooling the aqueous solution and thereby causing a precipitate to be formed, separating the precipitate and thereby recovering salt of lignoceric acid as a precipitate.

7. A method of processing a crude composition obtained from bark, comprising treating the composition in a solution of bark extracting alcohol and an alkali metal hydroxide so as to convert the composition to alkaline form, adding water to the solution and heating the aqueous solution to remove the alcohol, and extracting the aqueous solution with a hydrocarbon solvent selected from the group consisting of hexane and benzene to remove the solvent solubles, cooling the aqueous solution and thereby causing a precipitate to be formed, separating the precipitate and thereby recovering salt of lignoceric acid as a precipitate.

8. A method of processing a salt of wax obtained from bark to recover lignoceric acid, lignoceryl alcohol and sterol, comprising extracting the salt of wax with a hydrocarbon solvent selected from the group consisting of hexane and benzene to remove the solvent solubles, dissolving the extracted salt of wax in hot water, cooling and acidifying the aqueous solution and recovering lignoceric acid, cooling and concentrating the solvent solution and recovering the lignoceryl alcohol, evaporating the remaining solvent and recovering sterol containing residue.

9. A method of processing a crude composition obtained from bark, comprising treating the composition in a solution of bark extracting alcohol and an alkali metal hydroxide so as to convert the composition to alkaline form, separating the insolubles from the solution, removing the said bark extracting alcohol and alkali metal hydroxide and recovering a dry crude salt, extracting the crude salt with a hydrocarbon solvent selected from the group consisting of hexane and benzene, and removing the solvent solubles, dissolving the extracted insoluble residue in hot water, cooling the aqueous solution and thereby causing a precipitate to be formed, separating the precipitate and thereby recovering salt of lignoceric acid as a precipitate.

10. A method of separating lignoceric acid, lignoceryl alcohol and sterol containing residue from an alkaline composition obtained from bark, comprising extracting the composition with a hydrocarbon solvent selected from the group consisting of hexane and benzene, and removing lignoceryl alcohol and sterol in the solvent stream, recovering lignoceryl alcohol by cooling and concentrating the solvent and recovering sterol containing residue by evaporation of the remaining solvent, heating the alkaline residue of the extracted composition in water to form an aqueous solution, cooling the aqueous solution and recovering a salt precipitate, acidifying the precipitate and recovering lignoceric acid.

References Cited in the file of this patent

UNITED STATES PATENTS 2,662,893   Kurth _____ Dec. 15, 1953

OTHER REFERENCES

Sullivan: Journal of Industrial and Engineering Chemistry, November 1916, pages 1027–1028.